US012013667B2

(12) United States Patent
Tsuji

(10) Patent No.: US 12,013,667 B2
(45) Date of Patent: Jun. 18, 2024

(54) EXTERIOR MEMBER, CASE AND TIMEPIECE

(71) Applicant: CASIO COMPUTER CO., LTD., Tokyo (JP)

(72) Inventor: Ayako Tsuji, Fuchu (JP)

(73) Assignee: CASIO COMPUTER CO., LTD., Tokyo (JP)

(*) Notice: Subject to any disclaimer, the term of this patent is extended or adjusted under 35 U.S.C. 154(b) by 288 days.

(21) Appl. No.: 17/387,053

(22) Filed: Jul. 28, 2021

(65) Prior Publication Data

US 2022/0043399 A1 Feb. 10, 2022

(30) Foreign Application Priority Data

Aug. 5, 2020 (JP) ................................ 2020-132925

(51) Int. Cl.

*G04B 37/18* (2006.01)
*G04B 37/00* (2006.01)
*G04B 45/00* (2006.01)

(52) U.S. Cl.

CPC ........... *G04B 37/18* (2013.01); *G04B 37/005* (2013.01); *G04B 45/0092* (2013.01)

(58) Field of Classification Search

CPC .. G04B 37/18; G04B 37/005; G04B 45/0092; G04B 45/0076

See application file for complete search history.

(56) References Cited

U.S. PATENT DOCUMENTS

| | | | | | |
|---|---|---|---|---|---|
| 2,635,416 | A * | 4/1953 | Mietchen | A45C 11/10 | 368/286 |
| 3,740,944 | A * | 6/1973 | Chopard | G04B 43/005 | 368/286 |
| 7,648,266 | B2 * | 1/2010 | Saunier | G04B 3/045 | 368/286 |
| 8,220,987 | B2 * | 7/2012 | Kimura | G04C 3/004 | 368/293 |
| 9,101,184 | B2 * | 8/2015 | Wilson | A44C 5/14 | |
| 2011/0032804 | A1 * | 2/2011 | Scioscia | G04B 37/05 | 368/281 |

(Continued)

FOREIGN PATENT DOCUMENTS

| | | |
|---|---|---|
| JP | H11-044775 A | 2/1999 |
| JP | H11-064543 A | 3/1999 |

(Continued)

OTHER PUBLICATIONS

1 Notice of Reasons for Refusal dated Jun. 20, 2022 received in Japanese Patent Application No. JP 2020-132925.

*Primary Examiner* — Edwin A. Leon
*Assistant Examiner* — Sean R Brannon
(74) *Attorney, Agent, or Firm* — Scully, Scott, Murphy & Presser, P.C.

(57) ABSTRACT

A case including a case main body, an operation member having an operation head portion which protrudes outside of the case main body, an exterior member which is detachably attached to the case main body while covering outer periphery of the case main body, in which the case main body has a protection projection provided on an outer peripheral surface such that an outward projection length becomes shorter from an upper side toward a lower side, and the exterior member has a housing portion which houses the protection projection.

20 Claims, 8 Drawing Sheets

(56) References Cited

U.S. PATENT DOCUMENTS

| | | | | |
|---|---|---|---|---|
| 2011/0096481 | A1* | 4/2011 | Ueno | G04G 17/08 361/679.01 |
| 2012/0176871 | A1* | 7/2012 | Ueno | G04B 37/052 368/287 |
| 2013/0021881 | A1* | 1/2013 | Bertucci | G04B 43/002 368/286 |
| 2017/0248922 | A1* | 8/2017 | Hynecek | A45C 11/12 |
| 2019/0265650 | A1* | 8/2019 | Counas | E05G 1/10 |

FOREIGN PATENT DOCUMENTS

| | | | |
|---|---|---|---|
| JP | 2001116859 | A | 4/2001 |
| JP | 3165529 | U | 1/2011 |
| JP | 2015-138599 | A | 7/2015 |

* cited by examiner

EXTERIOR MEMBER, CASE AND TIMEPIECE

CROSS-REFERENCE TO RELATED APPLICATION

This application is based upon and claims the benefit of priority from the prior Japanese Patent Applications No. 2020-132925, filed Aug. 5, 2020, the entire contents of which is incorporated herein by reference.

BACKGROUND

1. Technical Field

The technical field relates to an exterior member and a case that are used for electronic devices such as wristwatches, and a timepiece having the exterior member and the case.

2. Description of the Related Art

For example, a wristwatch is known which has a structure where an exterior member is interchangeably attached to a case, as described in Japanese Patent Application Laid-Open (Kokai) Publication No. H11-044775. In this structure, the exterior member includes a decorative section with decoration and fitting sections provided on peripheral edges of the decorative section so as to be arranged on the peripheral surface of the case.

SUMMARY

One embodiment is a case comprising: a case main body; an operation member having an operation head portion which protrudes outside of the case main body; an exterior member which is detachably attached to the case main body while covering outer periphery of the case main body, wherein the case main body has a protection projection provided on an outer peripheral surface such that an outward projection length becomes shorter from an upper side toward a lower side, and wherein the exterior member has a housing portion which houses the protection projection.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of a wristwatch will hereinafter be described with reference to FIG. 1 to FIG. 8B.

Figure 1:
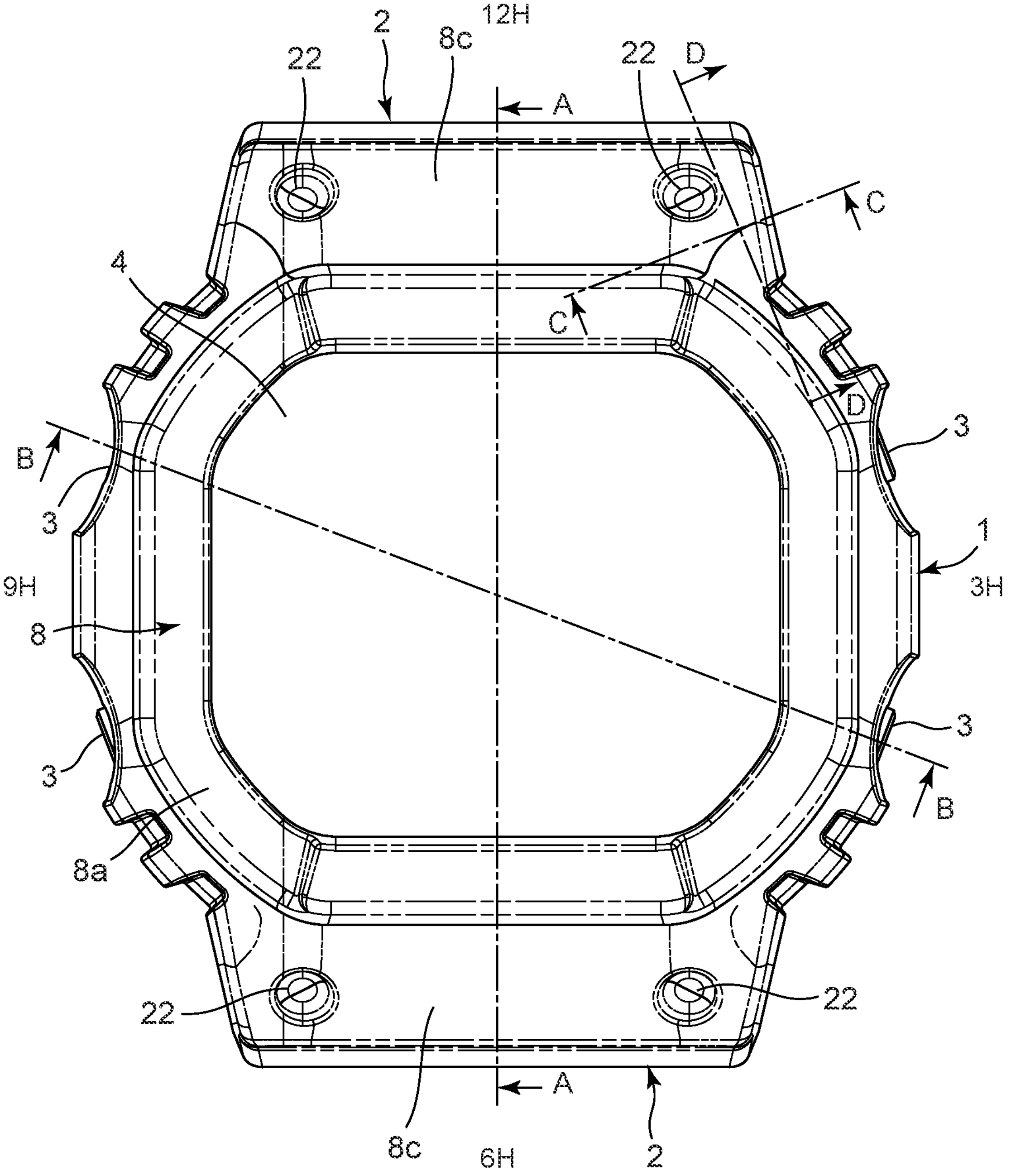
FIG. 1 is an enlarged front view showing an embodiment of a wristwatch.
Figure 2:
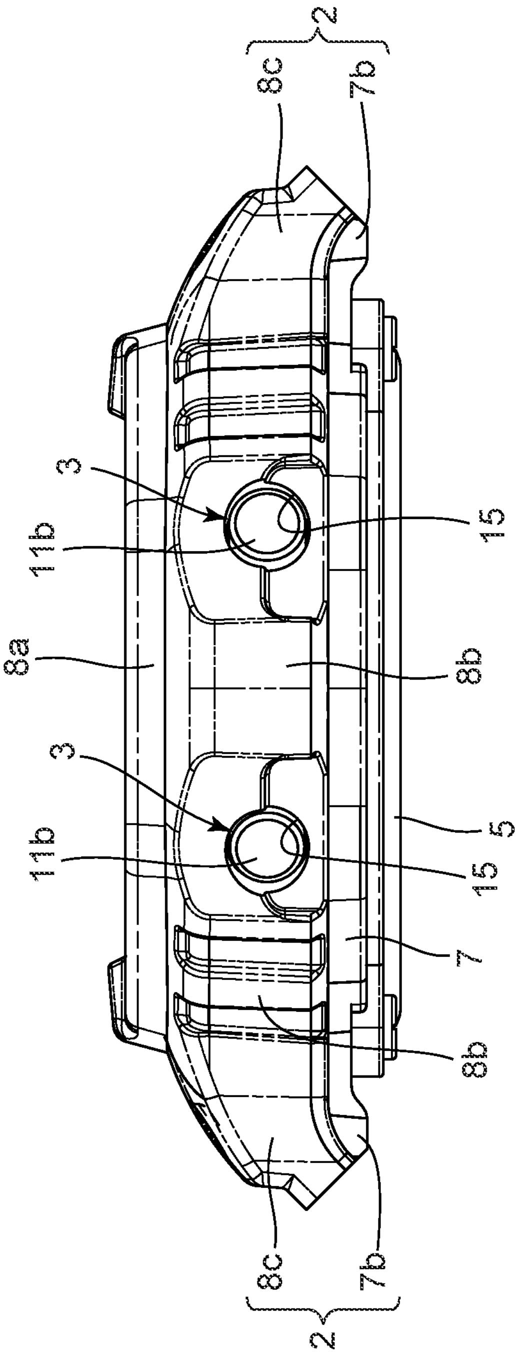
FIG. 2 is an enlarged side view showing the wristwatch of FIG. 1 when viewed from the nine o'clock side.
Figure 3:
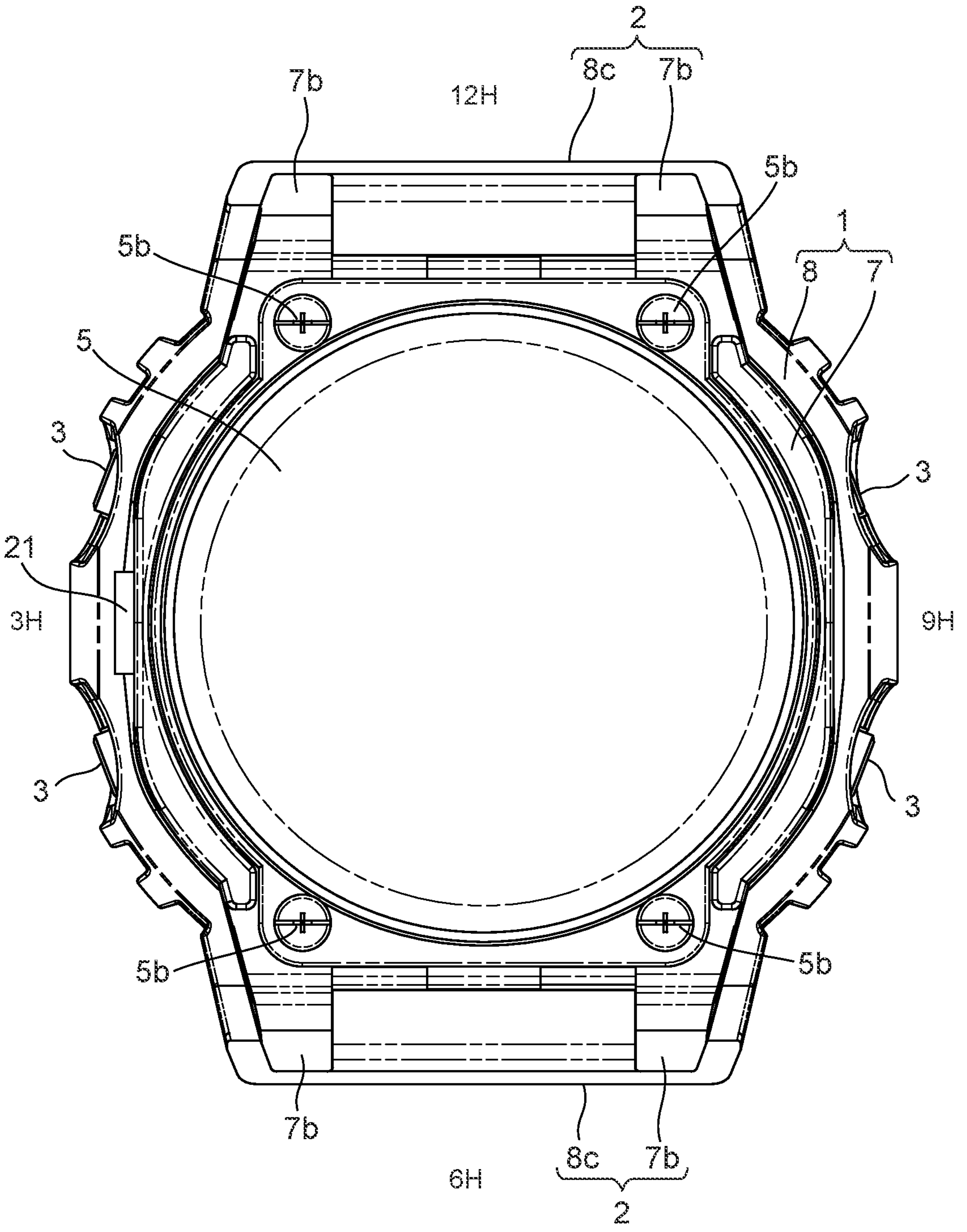
FIG. 3 is an enlarged rear view of the wristwatch shown in FIG. 1.

This wristwatch has a wristwatch case 1, as shown in FIG. 1 to FIG. 3. On the twelve o'clock side and six o'clock side of the wristwatch case 1, later-described band attachment sections 2 are provided to which watch bands (not shown in the drawings) are attached.

In portions of the wristwatch case 1 on the two o'clock side, the four o'clock side, the eight o'clock side, and the ten o'clock side, switch devices 3 are provided. These switch devices 3 are push-button switches for selecting and performing various types of functions such as a time correction function and a display function. In particular, the switch device 3 on the ten o'clock side is used for time correction.

Also, to the upper opening of the wristwatch case 1, a watch glass 4 is attached via a glass packing 4*a*, as shown in FIG. 1 to FIG. 4. To the lower part of this wristwatch case 1, a back cover 5 is attached by a plurality of screws 5*b* via a waterproofing packing 5*a*. Inside this wristwatch case 1, a timepiece module 6 is provided.

Although not shown in the drawings, the timepiece module 6 includes various types of components required for timepiece functions, such as a timepiece movement which moves pointers to indicate the time, a display section which electro-optically displays information including time information, and a circuit section which electrically controls and drives these sections. This timepiece module 6 is provided in the wristwatch case 1 with it being held by a module holding plate 6*a*, as shown in FIG. 4.

Figure 4:
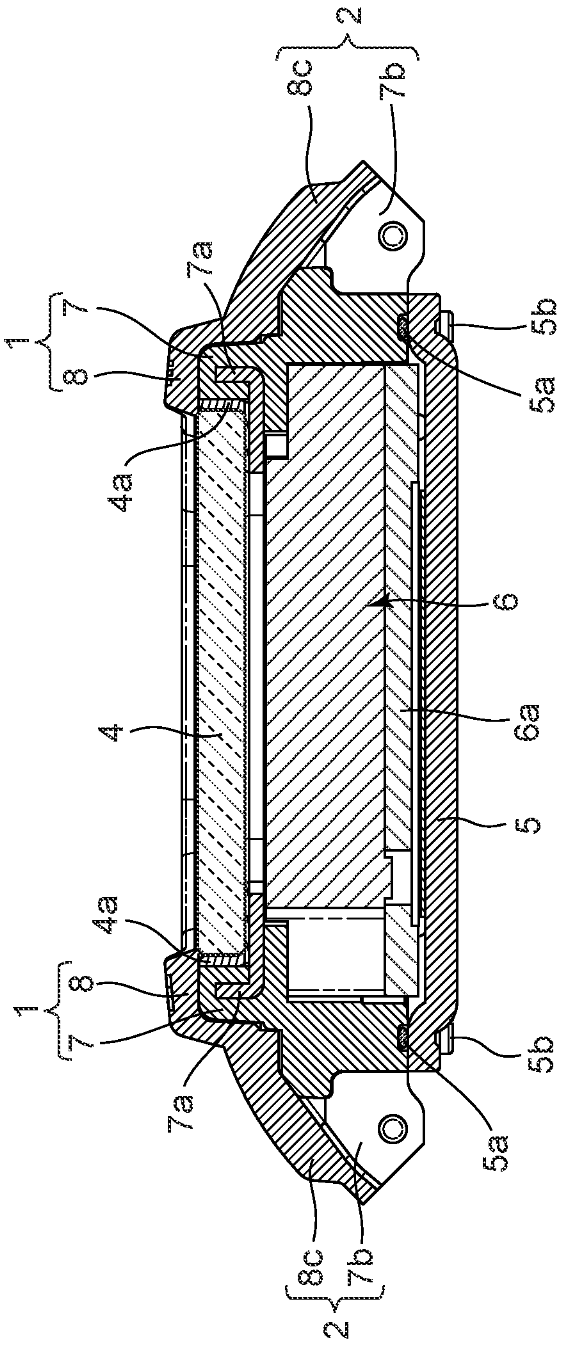
FIG. 4 is an enlarged cross-sectional view of the wristwatch taken along the A-A arrow view in FIG. 1.
Figure 5:
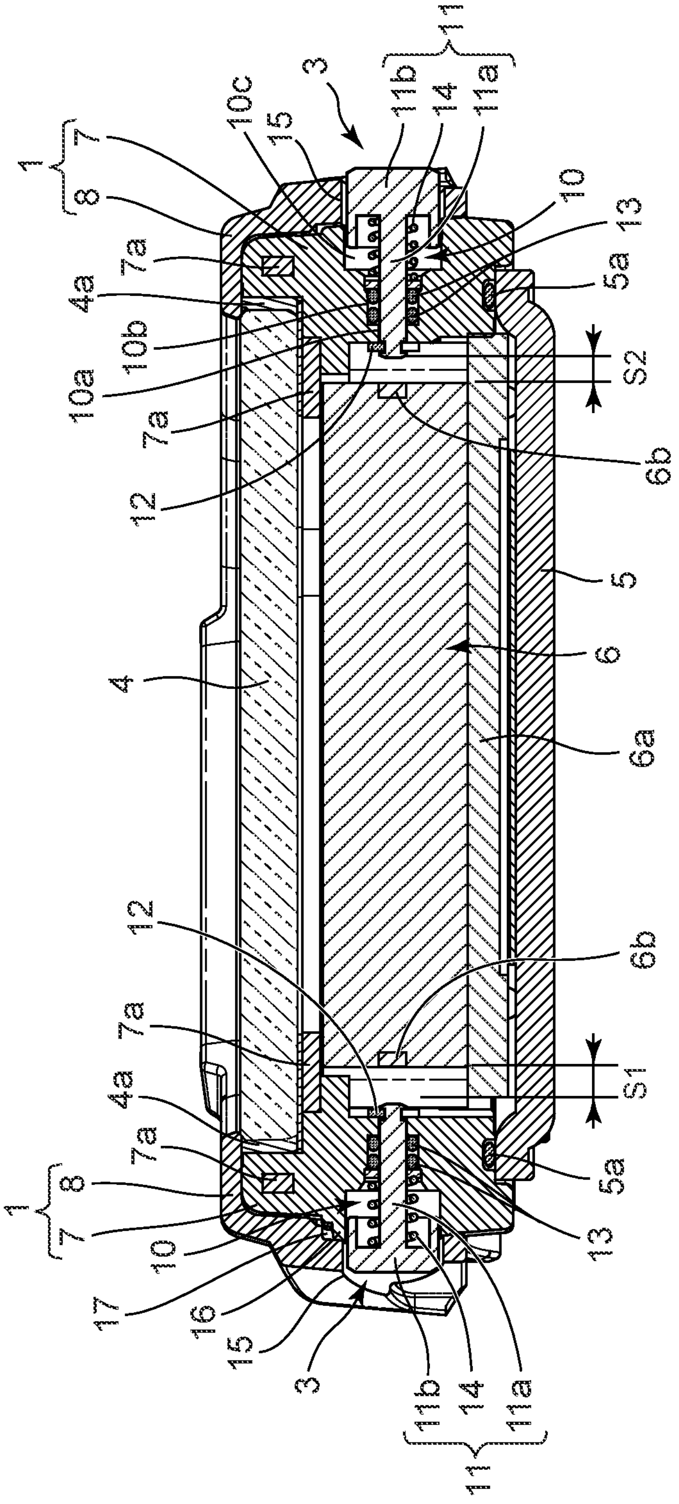
FIG. 5 is an enlarged cross-sectional view of the wristwatch taken along the B-B arrow view in FIG. 1.

The wristwatch case 1 includes a case main body 7 and an exterior member 8, as shown in FIG. 4 and FIG. 5. The case main body 7 is made of a light-weight and high-strength material acquired by carbon fiber or glass fiber being mixed into a highly rigid polyamide resin. In a peripheral portion of this case main body 7, a metal reinforcement member 7*a* is embedded, and a portion of which protrudes into the case main body 7. Also, on the twelve o'clock side and six o'clock side of this case main body 7, band attachment main bodies 7*b* of the band attachment sections 2 are provided projecting outward.

Figure 6:
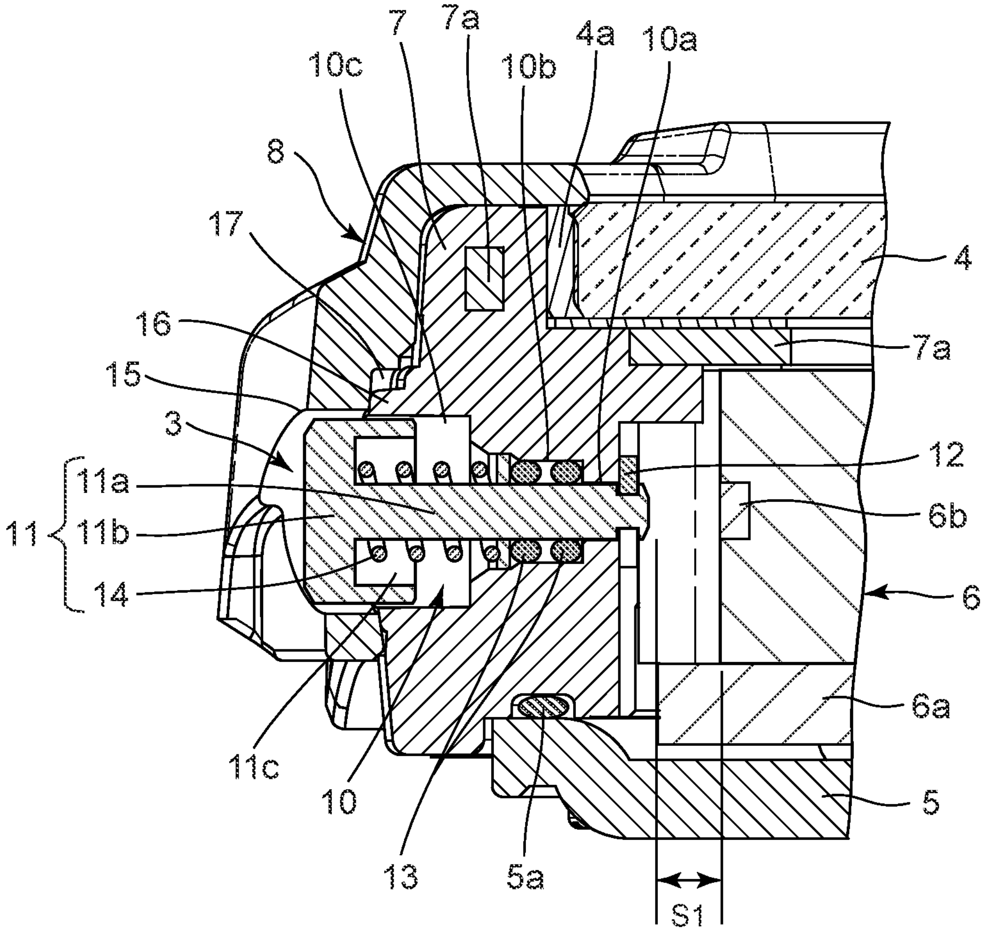
FIG. 6 is an enlarged cross-sectional view of a main portion of the wristwatch in FIG. 5, in which a switch device on the ten o'clock side is shown.

In this case main body 7, a plurality of penetration holes 10 are formed to which the plurality of switch devices 3 is attached, as shown in FIG. 5 and FIG. 6. Here, each switch device 3 includes an operation member 11 which is attached to the corresponding penetration hole 10 in the case main body 7. This operation member 11 includes an operation shaft 11*a* which is inserted into the penetration hole 10 in the case main body 7, and an operation head section 11*b* provided on the outer end of the operation shaft 11*a*.

Each penetration hole 10 of the case main body 7 includes a small diameter hole section 10*a*, a medium diameter hole section 10*b*, and a large diameter hole section 10*c*, as shown in FIG. 5 and FIG. 6. The small diameter hole section 10*a* is provided in an inner end portion of the penetration hole 10 medially located in the case main body 7. This small diameter hole section 10*a* is formed such that its inner diameter is equal to the outer diameter of the corresponding operation shaft 11*a* and its axial length is slightly shorter than the outer diameter of the operation shaft 11*a*.

The medium diameter hole section 10*b* is formed in a middle portion of the penetration hole 10 such that its inner diameter is greater than that of the small diameter hole section 10*a* and shorter than that of the large diameter hole section 10*c*, as shown in FIG. 5 and FIG. 6. The axial length of this medium diameter hole section 10*b* is substantially half the thickness of the corresponding peripheral portion of the case main body 7.

The large diameter hole section 10*c* is provided in an outer end portion of the penetration hole 10 located on the outer side of the case main body 7. This large diameter hole section 10*c* is formed such that its inner diameter is substantially equal to the outer diameter of the corresponding operation head section 11*b* and greater than the inner diameter of the medium diameter hole section 10*b*, as shown in FIG. 5 and FIG. 6. The axial length of this large diameter hole section 10*c* is slightly shorter than that of the medium diameter hole section 10*b*.

Each of the above-described operation members 11 is structured such that its operation shaft 11*a* is inserted into the corresponding penetration hole 10, and the outer end of its operation head section 11*b* protrudes outside of the case main body 7 from the penetration hole 10, as shown in FIG. 5 and FIG. 6. That is, the operation shaft 11*a* is formed such that its axial length is substantially equal to or slightly shorter than that of the penetration hole 10.

As a result, the operation shaft 11*a* is structured such that its inner end protrudes from the small diameter hole section 10*a* of the penetration hole 10 into the case main body 7, and its outer end is located in the outer end of the penetration hole 10, as shown in FIG. 5 and FIG. 6. In addition, the operation shaft 11*a* is structured such that a stopper member 12 such as an E-ring is attached to its inner end protruding into the case main body 7 so that it is not slipped out from the case main body 7.

This operation shaft 11*a* is slidably inserted into a plurality of waterproof rings 13 arranged in the medium diameter hole section 10*b* of the penetration hole 10, as shown in FIG. 5 and FIG. 6. As a result, the operation shaft 11*a* is structured such that waterproofing between the inner circumferential surface of the penetration hole 10 and the outer circumferential surface of the operation shaft 11*a* is achieved by the outer circumferential surface of the operation shaft 11*a* sliding while being in pressure contact with the inner circumferential surfaces of the waterproof rings 13.

The operation head section 11*b* is formed such that its outer diameter is substantially equal to the inner diameter of the large diameter hole section 10*c* of the penetration hole 10 and its axial length is longer than that of the large diameter hole section 10*c* of the penetration hole 10, as shown in FIG. 5 and FIG. 6. That is, the operation head section 11*b* is structured such that its inner end is arranged in the large diameter hole section 10*c* of the penetration hole 10 and its outer end protrudes outside of the case main body 7.

In addition, the operation head section 11*b* is structured such that a recess section 11*c* is formed its inner end surface, and the outer end of the operation shaft 11*a* is provided on the inner surface of this recess section 11*c*, as shown in FIG. 5 and FIG. 6. This operation head section 11*b* is structured to be forced by a spring member 14 in a direction to be pushed toward the outside of the case main body 7.

More specifically, the spring member 14 is structured such that it is arranged on the outer circumferential portion of the operation shaft 11*a*, its one end comes in resilient contact with the waterproof ring 13, and its other end comes in resilient contact with the inner surface of the recess section 11*c* of the operation head section 11*b*, as shown in FIG. 5 and FIG. 6. As a result, the spring member 14 is structured to force the operation head section 11*b* in the direction in which the operation head section 11*b* is pushed toward the outside of the case main body 7.

On the other hand, the exterior member 8 is formed of a soft synthetic resin such as urethane resin, or a hard synthetic resin, as shown in FIG. 1 to FIG. 5 and FIG. 7. This exterior member 8 is structured to be detachably attached while covering the upper surface and outer peripheral surface of the case main body 7.

More specifically, this exterior member 8 has integrally formed thereon an upper side section 8*a* which is arranged covering the upper surface of the case main body 7, an outer peripheral section 8*b* which is arranged covering the outer peripheral surface of the case main body 7, and band attachment covers 8*c* which are arranged covering the band attachment main bodies 7*b* of the case main body 7, as shown in FIG. 1 to FIG. 5 and FIG. 7.

Figure 7:
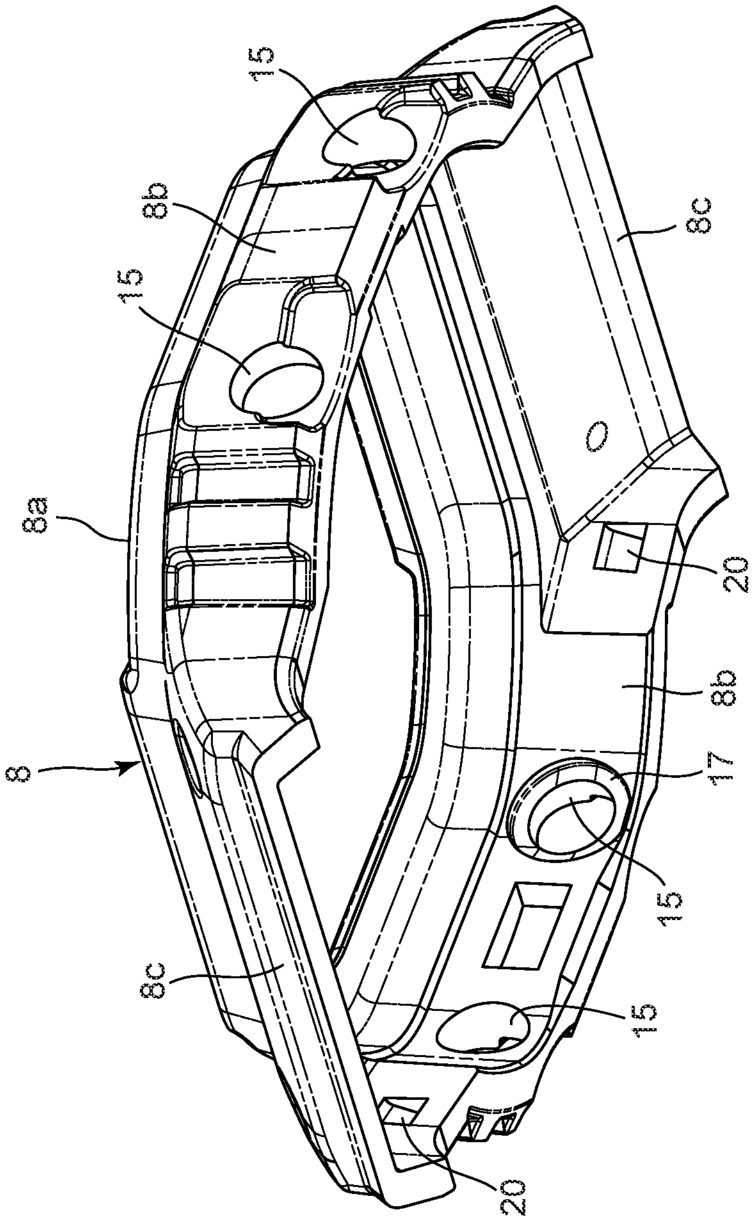
FIG. 7 is an enlarged perspective view showing an exterior member of a wristwatch case shown in FIG. 1.

In the outer peripheral section 8*b* of this exterior member 8, a plurality of engaging holes 15 is provided into which the operation head sections 11*b* of the plurality of operation members 11 protruding outside of the case main body 7 are inserted to be engaged therein, as shown in FIG. 5 to FIG. 7. More specifically, the plurality of engaging holes 15 is provided in the outer peripheral section 8*b* of the exterior member 8 while corresponding to portions of the case main body 7 on the two o'clock side, the four o'clock side, the eight o'clock side, and the ten o'clock side.

Each of the plurality of engaging holes 15 is formed such that its inner diameter is slightly greater than the outer diameter of the corresponding operation head section 11*b*, as shown in FIG. 5 and FIG. 7. Among the plurality of the operation head sections 11*b* which is inserted into and engaged in the plurality of engaging holes 15, three operation head sections 11*b* on the two o'clock side, the four o'clock side, and the eight o'clock side, that is, the operation head sections 11*b* excluding that on the ten o'clock side are formed having axial lengths by which they protrude outside of the exterior member 8 from the corresponding engaging holes 15.

On the ten o'clock side of the case main body 7, a substantially cylindrical protection projection 16 is provided which protects the outer circumferential portion of the operation head section 11*b* of the corresponding operation member 11 protruding outside of the case main body 7, as shown in FIG. 5 and FIG. 6. When the operation head section 11*b* is subjected to an impact from the vertical direction, this protection projection 16 buffers the impact and prevents the operation shaft 11*a* from being bent.

This protection projection 16 is formed such that its inner diameter is substantially equal to that of the large diameter hole section 10*c* of the corresponding penetration hole 10 and its axial length, in other words, its projection length from the outer peripheral surface of the case main body 7 is half the axial length of the operation head section 11*b*, as shown in FIG. 6. In addition, this protection projection 16 is formed in a substantially cylindrical shape inclined as a whole such that its projection length from the outer peripheral surface of the case main body 7 gradually becomes shorter from the upper side of the case main body 7 toward the lower side. That is, this protection projection 16 is formed in a substantially cylindrical shape whose end surface is inclined such that its projection length is longest at its upper rim portion and gradually becomes shorter toward its lower side, and its lower rim portion is substantially flush with the outer peripheral surface of the case main body 7, as shown in FIG. 6.

Also, in the inner surface of the outer peripheral section 8*b* of the exterior member 8 on the ten o'clock side, a guide housing section 17 having a substantially ring shape is provided to be recessed on the same axis as the corresponding engaging hole 15, as shown in FIG. 6 and FIG. 7. This guide housing section 17 is formed along the rim of the engaging hole 15 opposing the outer peripheral surface of the case main body 7 such that its axial length (depth) toward the inside is substantially equal to the projection length of the protection projection 16. The inner diameter of the guide housing section 17 is slightly greater than the outer diameter of the protection projection 16.

More specifically, the guide housing section 17 is formed such that its axial length (depth) toward the inside gradually becomes shorter (shallower) from the upper side toward the lower side, and its lower rim portion is substantially flush with the inner peripheral surface of the outer peripheral section 8*b* of the exterior member 8, as shown in FIG. 6 and FIG. 7. As a result, the guide housing section 17 is structured such that, when the exterior member 8 is to be attached to the case main body 7 from above, the lower rim portion of the guide housing section 17 comes in contact with the projecting rim surface of the upper rim portion of the protection projection 16 and is smoothly slid along the inclined end surface of the protection projection 16, whereby the protection projection 16 is inserted into and housed in the guide housing section 17.

The above-described protection projection 16 is structured such that, when the exterior member 8 is attached to the case main body 7, the upper portion of this protection projection 16 is arranged in the deeply formed upper portion of the guide housing section 17, the lower portion thereof is arranged in the shallowly formed lower portion of the guide housing section 17, and the lower rim portion thereof is arranged on a portion of the inner peripheral surface of the outer peripheral section 8*b* of the exterior member 8 located right below the lower rim portion of the guide housing section 17, as shown in FIG. 6 and FIG. 7.

Also, the guide housing section 17 is structured such that, since its inner diameter is greater than the outer diameter of the protection projection 16, a space is formed between its inner circumferential surface and the outer circumferential surface of the protection projection 16, which enables the protection projection 16 to be easily attached to or detached from the guide housing section 17, as shown in FIG. 6 and FIG. 7.

Moreover, the guide housing section 17 is structured such that, since the lower rim portion of the protection projection 16 is on the portion of the inner surface of the outer peripheral section 8*b* of the exterior member 8 right below the lower rim portion of the guide housing section 17 with the end surface of the protection projection 16 being in contact with the inner surface of the guide housing section 17, the inner surface of the guide housing section 17 is smoothly slid along the end surface of the protection projection 16 and the protection projection 16 is released from the guide housing section 17 when the exterior member 8 is detached from the case main body 7, as shown in FIG. 6 and FIG. 7.

Also, the engaging hole 15 on the ten o'clock side is structured such that the outer end surface of the operation head section 11*b* of the operation member 11 on the ten o'clock side is arranged inside the engaging hole 15 without protruding from the outer peripheral section 8*b* of the exterior member 8, as shown in FIG. 5 and FIG. 6. On the other hand, the operation member 11 of the switch device 3 on the ten o'clock side is formed such that its movement stroke S1 is greater than the movement strokes S2 of the operation members 11 of the other switch devices 3, that is, the switch devices 3 on the two o'clock side, the four o'clock side, and the eight o'clock side, as shown in FIG. 5 and FIG. 6.

More specifically, this switch device 3 on the ten o'clock side is formed such that the length from the inner end of the operation shaft 11*a* of its operation member 11 to a contact section 6*b* of the timepiece module 6 is greater than the axial length of the engaging hole 15 of the exterior member 8 on the ten o'clock side and the lengths from the inner ends of the operation shafts 11*a* of the other switch devices 3, that is, the switch devices 3 on the two o'clock side, the four o'clock side, and the eight o'clock side to contact sections 6*b* of the timepiece module 6, as shown in FIG. 5 and FIG. 6.

As a result, the switch device 3 on the ten o'clock side is structured such that, since the movement stroke S1 of the operation member 11 is greater than the axial length of the engaging hole 15 of the exterior member 8 on the ten o'clock side, the inner end of the operation shaft 11*a* does not come in contact with the contact section 6*b* of the timepiece module 6 even though the operation head section 11*b* is pressed by the exterior member 8 when the exterior member 8 is attached to or detached from the case main body 7, whereby the switch device 3 is prevented from unintentionally entering the ON state, as shown in FIG. 5 and FIG. 6.

The above-described exterior member 8 includes a plurality of engaging recess sections 20 with which a plurality of hook sections 18 provided on the case main body 7 is disengageably engaged, as shown in FIG. 7 and FIG. 8. These engaging recess sections 20 are substantially rectangular recesses with which the plurality of hook sections 18 of the case main body 7 are disengageably engaged.

Also, these engaging recess sections 20 are formed such that their inner depths gradually become greater from the upper side of the exterior member 8 toward the lower side thereof, as shown in FIG. 7 and FIG. 8. In addition, these engaging recess sections 20 are provided in the inner surface of the outer peripheral section 8*b* of the exterior member 8 and located near the side portions of the band attachment covers 8*c* of the exterior member 8.

Figure 8A:
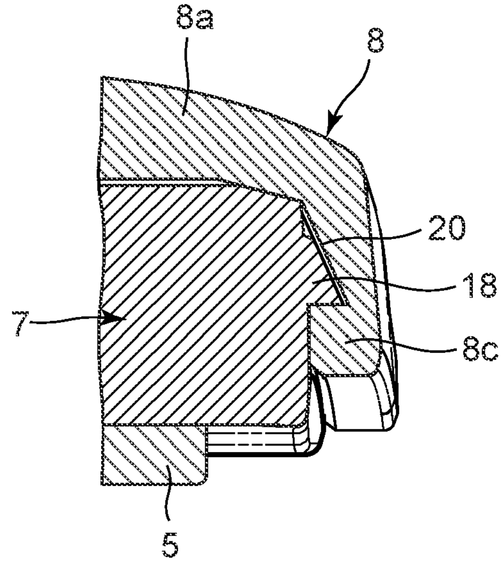
FIG. 8A is an enlarged cross-sectional view showing a main portion of the wristwatch taken along the C-C arrow view in FIG. 1.
Figure 8B:
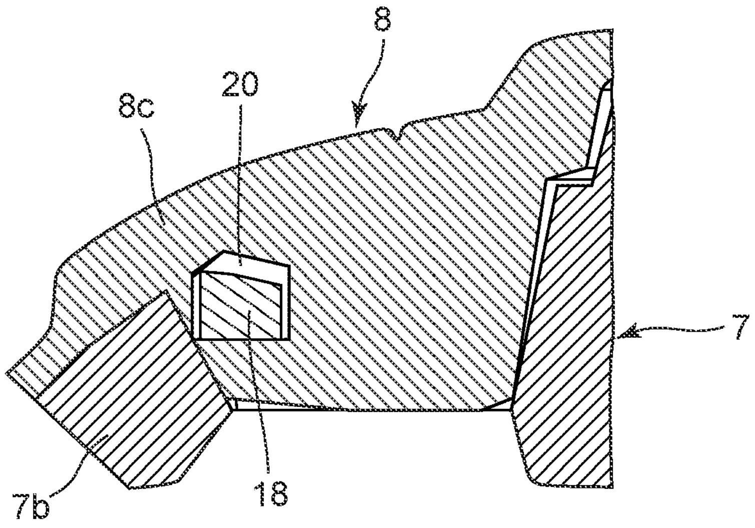
FIG. 8B is an enlarged cross-sectional view showing the main portion of the wristwatch taken along the D-D arrow view in FIG. 1.

The plurality of hook sections 18 is a plurality of projections which engages with the plurality of engaging recess sections 20 of the exterior member 8, as shown in FIG. 8A and FIG. 8B. These hook sections 18 are formed such that their projection lengths gradually become longer from the upper side of the case main body 7 toward the lower side thereof, and are provided on the outer peripheral surface of the case main body 7 in a manner to be located near the side portions of the band attachment main bodies 7*b*.

In addition, these hook sections 18 are structured such that, when the exterior member 8 is attached to the outer peripheral portion of the case main body 7, they are arranged in the plurality of engaging recess sections 20, and their greatly projecting lower portions engage with the deeply recessed lower portions of the engaging recess sections 20 so as to lock the exterior member 8, as shown in FIG. 8A and FIG. 8B.

That is, the exterior member 8 is structured such that, when the upper side section 8*a* is arranged on the upper surface of the case main body 7 and the outer peripheral section 8*b* is arranged on the outer peripheral portion of the case main body 7, the plurality of hook sections 18 is arranged in the plurality of engaging recess sections 20 and held on the inner bottom surfaces thereof, whereby the exterior member 8 is prevented from upwardly coming off the case main body 7, as shown in FIG. 8A and FIG. 8B.

In the lower end surface of the exterior member 8, or in other words, in the lower end surface of the outer peripheral section 8*b*, a detachment groove 21 is provided for detaching the exterior member 8 from the case main body 7, as shown in FIG. 3. This detachment groove 21 is provided in a portion of the exterior member 8 on the three o'clock side along the outer periphery of the outer peripheral section 8*b*.

Also, this detachment groove 21 is a slit-shaped elongated recess section provided along the outer periphery of the outer peripheral section 8*b*, and is formed such that a tool such as a screwdriver (not shown in the drawings) can be inserted thereinto, as shown in FIG. 3. The exterior member 8 is structured such that a tool such as a screwdriver can be inserted into this detachment groove 21 so as to roll up the outer peripheral section 8*b* and detach the exterior member 8 from the case main body 7.

This exterior member 8 is attached to the case main body 7 by a plurality of screws 22, as shown in FIG. 1. More specifically, in the case of this exterior member 8, side portions of the band attachment covers 8*c* are attached to the band attachment main bodies 7*b* by the plurality of screws 22 with the band attachment covers 8*c* on the twelve o'clock side and the six o'clock side being arranged covering the band attachment main bodies 7*b* of the case main body 7.

Next, an assembly procedure for the above-described wristwatch is described.

In the assembly of this wristwatch, first, the watch glass 4 is fitted into the upper opening of the case main body 7 together with the glass packing 4*a*. Then, the operation members 11 of the plurality of switch devices 3 are attached to the case main body 7 in this state.

Before this attachment, the plurality of waterproof rings 13 is sequentially inserted into each medium diameter hole section 10*b* of the plurality of penetration holes 10 provided in the case main body 7. In this state, each operation shaft 11*a* of the plurality of operation members 11 is inserted into the corresponding penetration hole 10 of the case main body 7. Here, each operation shaft 11*a* is inserted into the corresponding waterproof rings 13 fitted into the medium diameter hole section 10*b* of the corresponding penetration hole 10. As a result, each operation shaft 11*a* is slidably inserted into the corresponding waterproof rings 13 with its outer circumferential surface being in pressure contact with inner circumferential surfaces of the waterproof rings 13. Consequently, waterproofing between the inner circumferential surface of each penetration hole 10 and the outer circumferential surface of the corresponding operation shaft 11*a* is achieved.

Also, here, the inner end of each operation head section 11*b* is arranged in the large diameter hole section 10*c* of the corresponding penetration hole 10 with the inner end of the corresponding operation shaft 11*a* protruding into the case main body 7 and the outer end of the operation head section 11*b* protruding outside of the case main body 7. In this state, the stopper members 12 such as E-rings are attached to the inner ends of the operation shafts 11*a* protruding into the case main body 7.

As a result, the plurality of operation members 11 is attached to the penetration holes 10 of the case main body 7 in a manner not to be slipped out from the case main body 7. In this state, a substantially middle portion of the operation head section 11*b* on the ten o'clock side has been arranged in and protected by the substantially cylindrical protection projection 16 provided projecting on the outer peripheral surface of the case main body 7.

Then, the timepiece module 6 is inserted into the case main body 7 from below and arranged therein by being held by the module holding plate 6*a*. Here, the plurality of contact sections 6*b* of the timepiece module 6 corresponds to the inner ends of operation shafts 11*a* of the plurality of operation members 11.

In this embodiment, the operation member 11 of the switch device 3 on the ten o'clock side among the plurality of switch devices 3 is attached to the corresponding penetration hole 10 of the case main body 7 such that its movement stroke S1 is greater than the axial length of the engaging hole 15 of the exterior member 8 on the ten o'clock side and the movement strokes S2 of the operation members 11 of the other switch devices 3, or in other words, the movement strokes S2 of the three switch devices 3 on the two o'clock side, the four o'clock side, and the eight o'clock side.

That is, in the case of the switch device 3 on the ten o'clock side, the length from the inner end of the operation shaft 11*a* of the operation member 11 to the corresponding contact section 6*b* of the timepiece module 6 is greater than the axial length of the engaging hole 15 of the exterior member 8 on the ten o'clock side and the lengths from the inner ends of the operation shafts 11*a* of the other switch devices 3, or in other words, the lengths from the inner ends of the operation shafts 11*a* of the switch devices 3 on the two o'clock side, the four o'clock side, and the eight o'clock side to the corresponding contact sections 6*b* of the timepiece module 6. Then, in this state, the back cover 5 and the waterproofing packing 5*a* are attached to the lower part of the case main body 7.

Subsequently, the exterior member 8 is attached covering the upper surface and outer peripheral surface of the case main body 7. Here, the outer peripheral section 8*b* of the exterior member 8 gradually covers the outer peripheral surface of the case main body 7 from above. As a result, the operation head sections 11*b* of the plurality of operation members 11 are pressed into the large diameter hole sections 10*c* of the penetration holes 10 of the case main body 7 by the lower end of the exterior member 8. Then, these operation head sections 11*b* are positioned corresponding to the engaging holes 15 of the exterior member 8.

Here, even though the operation head section 11*b* of the operation member 11 on the ten o'clock side is pressed into the large diameter hole section 10*c* of the corresponding penetration hole 10 by the exterior member 8, the switch device 3 on the ten o'clock side does not enter the ON state because of the structure where the movement stroke S1 of the operation member 11 on the ten o'clock side is greater than the axial length of the engaging hole 15 of the exterior member on the ten o'clock side and the movement strokes S2 of the other operation members 11, or in other words, the movement strokes S2 of the three operation members 11 on the two o'clock side, the four o'clock side, and the eight o'clock side.

As a result of this structure, even when the exterior member 8 is attached, unintentional time correction is not performed. That is, the switch device 3 on the ten o'clock side is prevented from performing unintentional operations. Also, even when pressed from above by the exterior member 8, the operation head section 11*b* of the operation member 11 on the ten o'clock side is protected by the protection projection 16, and therefore the operation shaft 11*a* of the operation member 11 is not bent by loads applied to the operation head section 11*b* by the exterior member 8.

When the operation head sections 11*b* of the plurality of operation members 11 are to be positioned corresponding to the plurality of engaging holes 15 of the exterior member 8, the lower rim portion of the guide housing section 17 provided around the engaging hole 15 on the ten o'clock side of the inner surface of the exterior member 8 comes in contact with the inclined end surface of the protection projection 16 of the case main body 7 on the ten o'clock side, and the inner surface of the guide housing section 17 is smoothly slid along the inclined end surface of the protection projection 16, whereby the protection projection 16 is inserted and housed in the guide housing section 17.

Here, since the inner diameter of the guide housing section 17 is greater than the outer diameter of the protection projection 16 and therefore the space is formed between the outer circumferential surface of the protection projection 16 and the inner circumferential surface of the guide housing section 17, the protection projection 16 is favorably inserted into and housed in the guide housing section 17. In this state, the upper portion of the protection projection 16 having a greater projection length is in the upper portion of the guide housing section 17 having a greater depth, the lower portion of the protection projection 16 having a shorter projection length is in the lower portion of the guide housing section 17 having a lesser depth, and the lower rim portion of the protection projection 16 is on the portion of the inner peripheral surface of the outer peripheral section 8*b* of the exterior member 8 located right below the lower rim portion of the guide housing section 17.

As a result, the operation head sections 11*b* of the plurality of operation members 11 correspond to the plurality of engaging holes 15 of the exterior member 8, and therefore are pressed toward the outside of the case main body 7 by the spring force of the spring members 14 so as to be inserted into and engaged with the engaging holes 15 of the exterior member 8. Consequently, the exterior member 8 is mounted on and attached to the case main body 7.

In this state, among the operation head sections 11*b* of the plurality of operation members 11, the operation head sections 11*b* of the three operation members 11 on the two o'clock side, the four o'clock side, and the eight o'clock side have their outer ends protruding outside of the exterior member 8 from the corresponding engaging holes 15 of the exterior member 8. The operation head section 11*b* of the operation member 11 on the ten o'clock side is in the corresponding engaging hole 15 of the exterior member 8 without protruding outside of the exterior member 8.

When the exterior member 8 is to be attached to the case main body 7, if the exterior member 8 is accidentally upside down with its twelve o'clock side and six o'clock side reversed, the exterior member 8 cannot be attached to the outer peripheral portion of the case main body 7.

More specifically, since the guide housing section 17 is not provided around the engaging hole 15 on the four o'clock side, the protection projection 16 of the case main body 7 corresponding to the penetration hole 10 thereof on the ten o'clock side comes in contact with a lower end portion of the exterior member 8 on the four o'clock side. Accordingly, the operation head section 11*b* of the operation member 11 on the ten o'clock side is not inserted into the engaging hole 15 of the exterior member 8 on the four o'clock side. By this structure, the case main body 7 is prevented from being attached to the exterior member 8 upside down.

When the exterior member 8 is attached to the case main body 7 as described above, the upper side section 8*a* of the exterior member 8 is arranged on the upper surface of the case main body 7, the outer peripheral section 8*b* of the exterior member 8 is arranged on the outer peripheral surface of the case main body 7, and the band attachment covers 8*c* of the exterior member 8 are arranged covering the band attachment main bodies 7*b* of the case main body 7. Also, here, the plurality of hook sections 18 of the case main body 7 engages with the plurality of engaging recess sections 20 provided in the inner surface of the exterior member 8 and located near the side portions of the band attachment covers 8*c* of the exterior member 8.

That is, when the outer peripheral section 8*b* of the exterior member 8 is arranged on the outer peripheral portion of the case main body 7 such that the operation head sections 11*b* of the plurality of operation members 11 are inserted into and engaged with the plurality of engaging holes 15 provided in the outer peripheral section 8*b* of the exterior member 8, the plurality of hook sections 18 is arranged in and engaged with the plurality of engaging recess sections 20. As a result, the exterior member 8 is attached to the case main body 7 in a manner not to upwardly come off the case main body 7.

Then, the band attachment covers 8*c* of the exterior member 8 are attached to the band attachment main bodies 7*b* of the case main body 7 by the plurality of screws 22. In this state, the exterior member 8 does not come off the case main body 7. That is, the exterior member 8 has been firmly and favorably attached thereto. By this attachment, the assembly of the wristwatch case 1 and the wristwatch is completed.

Next, the mechanism of the above-described wristwatch is described.

In a normal state, this wristwatch displays information of various types of functions such as a time of day, a date, and a day of the week by the timepiece module 6 embedded in the wristwatch case 1. Also, these various functions, such as a time correction function, are switched by operations on the plurality of switch devices 3 provided in the wristwatch case 1.

In the case of the wristwatch case 1 of this wristwatch, its exterior member 8 can be switched to another exterior member. First, the plurality of screws 22 is removed from the band attachment covers 8*c* of the exterior member 8. Next, the wristwatch case 1 is turned over in this state, and a tool such as a screwdriver (not shown in the drawings) is inserted into the detachment groove 21 provided in the lower end surface of the exterior member 8 so as to roll up the exterior member 8.

As a result, the plurality of engaging recess sections 20 of the exterior member 8 is separated from the plurality of hook sections 18 of the case main body 7 so that the engagement of the plurality of engaging recess sections 20 with the plurality of hook sections 18 is released. Also, here, the engaging holes 15 of the exterior member 8 are separated from the operation head sections 11*b* of the plurality of operation members 11 provided in the case main body 7.

When the engaging holes 15 of the exterior member 8 are being separated from the operation head sections 11*b* of the plurality of operation members 11 provided in the case main body 7 as described above, a lower rim portion of the engaging hole 15 of the exterior member 8 on the ten o'clock side presses the corresponding operation head section 11*b* into the large diameter hole section 10*c* of the corresponding penetration hole 10. As a result, the guide housing section 17 provided around the engaging hole 15 of the exterior member 8 on the ten o'clock side is slid above the protection projection 16 of the case main body 7 on the ten o'clock side while being guided by the protection projection 16, whereby the protection projection 16 is released from the guide housing section 17.

In the case of the present embodiment, the substantially cylindrical protection projection 16 is formed such that its lower portion has a short projection length, and its lower rim portion is substantially flush with the outer peripheral surface of the case main body 7. In addition, the guide housing section 17 is formed such that its length (depth) in the axial direction of the engaging hole 15 becomes shorter (shallower) from the upper side toward the lower side, and its lower rim portion is substantially flush with the inner surface of the outer peripheral section 8*b* of the exterior member 8.

By this structure, when the exterior member 8 is to be detached from the case main body 7, the portion of the inner peripheral surface of the outer peripheral section 8*b* of the exterior member 8 located right below the lower rim portion of the guide housing section 17 is arranged on the lower rim portion of the protection projection 16 with the inner surface of the guide housing section 17 being in contact with the end surface of the protection projection 16, whereby the inner surface of the guide housing section 17 is smoothly slid along the inclined end surface of the protection projection 16, and the protection projection 16 is downwardly released from the guide housing section 17.

Here, the switch device 3 on the ten o'clock side does not enter the ON state. As a result, unintentional time correction is not performed. After the exterior member 8 is detached from the case main body 7 as described above, another exterior member 8 having a different color or a different ornament can be attached to the wristwatch and the wristwatch can be used with it.

In the case of the above-described conventional wristwatch disclosed in Japanese Patent Application Laid-Open (Kokai) Publication No. H11-044775, there is a problem in that, due to the structure where the exterior member is attached to the case by the decorative section of the exterior member being arranged on the upper surface of the case and the fitting sections of the exterior member being fitted together with the peripheral surface of the case, the exterior member tends to come off the case when the fitting of the case and the exterior member is loose, or the case may be damaged when the fitting of the case and the exterior member is tight. In order to solve this problem, an exterior member has been conceived which has a structure where a decorative section is provided with engaging sections into which watch bands are inserted and which engage with band attachment sections of a case. However, this exterior member has a problem in that, due to the structure where the watch bands are required to be inserted into the engaging sections of the exterior member, the attachment and detachment of the exterior member is bothersome and therefore the exterior member cannot be easily switched to another exterior member.

However, in the case of the present embodiment, the wristwatch case 1 includes the case main body 7, the operation members 11 which have the operation head sections 11*b* protruding outside of the case main body 7, the exterior member 8 which is detachably attached to the case main body 7 while covering the outer periphery thereof. On the outer peripheral surface of the case main body 7, the protection projection 16 is formed such that its projection length becomes shorter from the upper side toward the lower side, and protects the outer peripheral portion of the corresponding operation head section 11*b*. The exterior member 8 has the engaging holes 15 into which the operation head sections 11*b* are inserted to be engaged therein, and the guide housing section 17 which is provided around the corresponding engaging hole 15 and houses the protection projection 16. As a result, the exterior member 8 can be firmly and favorably attached to the case main body 7 or easily switched to another exterior member.

That is, in this wristwatch case 1, since the operation head sections 11*b* of the operation members 11 attached to the case main body 7 are inserted into and engaged with the engaging holes 15 of the exterior member 8, the exterior member 8 is firmly and favorably attached to the case main body 7 and does not easily come off the case main body 7. That is, the exterior member 8 is prevented from unintentionally coming off the case main body 7.

Also, in the case of this wristwatch case 1, the protection projection 16 is formed such that its projection length becomes shorter from the upper side toward the lower side, and housed in the guide housing section 17. Accordingly, even though the protection projection 16 which protects the corresponding operation head section 11*b* is provided on the case main body 7 while projecting outward, this protection projection 16 can be easily inserted into and housed in the guide housing section 17, and can be easily separated therefrom.

As such, in this wristwatch case 1, even though the protection projection 16 of the case main body 7 is arranged in the guide housing section 17 of the exterior member 8, the operation head section 11*b* of the operation member 11 on the ten o'clock side is easily and favorably released from the corresponding engaging hole 15 of the exterior member 8 when the protection projection 16 is released from the guide housing section 17. By this structure, the exterior member 8 can be easily detached from the case main body 7 and another exterior member 8 can be easily attached to the case main body 7. That is, the exterior member 8 can be easily switched to another exterior member.

Also, in this wristwatch case 1, even when the exterior member 8 comes in contact with the outer circumferential surface of the operation head section 11*b* of the operation member 11 on the ten o'clock side for the attachment or detachment of the exterior member 8 to or from the case main body 7, bending of the operation shaft 11*a* of the operation member 11 due to a load on the operation head section 11*b* by the exterior member 8 can be prevented by the operation head section 11*b* being protected by the protection projection 16.

Moreover, in the case of this wristwatch case 1, the guide housing section 17 of the exterior member 8 is formed such that its depth in the axial direction of the engaging hole 15 becomes lesser from the upper side toward the lower side, and its lower rim portion is substantially flush with the inner surface of the exterior member 8. By this structure, when the exterior member 8 is to be attached to the case main body 7, the guide housing section 17 of the exterior member 8 can be smoothly slid in the vertical direction with respect to the protection projection 16 even though the protection projection 16 is provided projecting on the outer peripheral surface of the case main body 7.

That is, in this wristwatch case 1, when the exterior member 8 is to be attached to the case main body 7, the lower rim portion of the guide housing section 17 of the exterior member 8 comes in contact with the inclined end surface of the substantially cylindrical protection projection 16 of the case main body 7. In this state, the inner surface of the guide housing section 17 is smoothly slid along the inclined end surface of the protection projection 16, whereby the protection projection 16 is unfailingly and favorably inserted into and housed in the guide housing section 17.

Also, in this wristwatch case 1, since the lower rim portion of the protection projection 16 is on the portion of the inner surface of the outer peripheral section 8*b* of the exterior member 8 located right below the lower rim portion of the guide housing section 17, the inner surface of the guide housing section 17 can be smoothly slid along the inclined end surface of the protection projection 16 when the exterior member 8 is detached from the case main body 7, whereby the protection projection 16 can be favorably released from the guide housing section 17.

Moreover, in the case of this wristwatch case 1, the operation member 11 on the ten o'clock side is formed such that its movement stroke S1 is greater than the axial length of the corresponding engaging hole 15 of the exterior member 8. Accordingly, in the case where the exterior member 8 is switched to another exterior member, even when the operation head section 11*b* of this operation member 11 is pressed by the exterior member 8, the switch device 3 can be prevented from entering the ON state.

That is, since the operation member 11 of the switch device 3 on the ten o'clock side is formed such that the distance between the inner end of its operation shaft 11*a* and the corresponding contact section 6*b* of the timepiece module 6 arranged in the case main body 7 is greater than the axial length of the corresponding engaging hole 15 of the exterior member 8, the inner end of the operation shaft 11*a* does not come in contact with the contact section 6*b* of the timepiece module 6 even when the operation head section 11*b* of the operation member 11 is pressed to some extent, whereby unintentional operations by the switch device 3 on ten o'clock side can be prevented.

Also, in this wristwatch case 1, the operation head section 11*b* of the operation member 11 on the ten o'clock side is arranged in the corresponding engaging hole 15 of the exterior member 8 without protruding outside of the exterior member 8. As a result of this structure, the insertion length of the operation head section 11*b* on the ten o'clock side when it is inserted into the corresponding engaging hole 15 of the exterior member 8 can be shortened, whereby the operation head section 11*b* on the ten o'clock side can be more easily attached to or detached from the engaging hole 15 of the exterior member 8.

Accordingly, in this wristwatch case 1, when the exterior member 8 is to be attached to the case main body 7, the operation head section 11*b* on the ten o'clock side can be easily inserted into and engaged with the corresponding engaging hole 15 of the exterior member 8. Also, when the exterior member 8 is to be detached from the case main body 7, this operation head section 11*b* on the ten o'clock side can be easily released from the engaging hole 15 of the exterior member 8.

Moreover, in this wristwatch case 1, the exterior member 8 includes the engaging recess sections 20 which are disengageably engaged with the hook sections 18 provided on the case main body 7. Accordingly, by these hook sections 18 of the case main body 7 being engaged with the engaging recess sections 20 of the exterior member 8, the exterior member 8 can be locked to the outer peripheral portion of the case main body 7 so as to be attached to the case main body 7. By this structure as well, the exterior member 8 does not easily come off the case main body 7, or in other words, the exterior member 8 is prevented from unintentionally coming off the case main body 7.

More specifically, in this wristwatch case 1, since the plurality of hook sections 18 is provided on the outer peripheral surface of the case main body 7 and located near the side portions of the band attachment main bodies 7*b*, and the plurality of engaging recess sections 20 is provided in the inner surface of the outer peripheral section 8*b* of the exterior member 8 and located near the side portions of the band attachment covers 8*c* of the exterior member 8, the plurality of hook sections 18 can be arranged in and engaged with the plurality of engaging recess sections 20 when the exterior member 8 is arranged on the outer peripheral portion of the case main body 7. As a result of this structure, the exterior member 8 is prevented from upwardly coming off the case main body 7.

Also, in this wristwatch case 1, the detachment groove 21 for detaching the exterior member 8 from the case main body 7 is provided in the lower end surface of the exterior member 8. Accordingly, by the wristwatch case 1 being turned over and a tool such as a screwdriver (not shown in the drawings) being inserted into the detachment groove 21 in the lower end surface of the exterior member 8 so as to roll up the exterior member 8, the exterior member 8 can be easily detached from the case main body 7.

By this structure, in this wristwatch case 1, even though the operation head sections 11*b* are inserted into and engaged with the engaging holes 15 of the exterior member 8 and the hook sections 18 of the case main body 7 are arranged in and engaged with the engaging recess sections 20 of the exterior member 8, the operation head sections 11*b* engaged with the engaging hole 15 of the exterior member 8 can be easily released therefrom and the hook sections 18 of the case main body 7 engaged with the engaging recess sections 20 of the exterior member 8 can be easily released therefrom, whereby the exterior member 8 is easily detached from the case main body 7.

Also, in this wristwatch case 1, the plurality of operation members 11 is provided in the outer peripheral portions of the case main body 7 and the protection projection 16 of the case main body 7 protects the operation head section 11*b* of one of these operation members 11. As a result of this structure, when the exterior member 8 is to be attached to the case main body 7, if the exterior member 8 is accidentally upside down with its twelve o'clock side and six o'clock side reversed, the exterior member 8 cannot be attached to the outer peripheral portion of the case main body 7 and is thereby prevented from being attached to the case main body 7 upside down.

Moreover, in this wristwatch case 1, the operation members 11 are structured to be provided in the four portions on the two o'clock side, the four o'clock side, the eight o'clock side, and the ten o'clock side, and the protection projection 16 is structured to protect only the operation head section 11*b* on the ten o'clock side. Accordingly, the guide housing section 17 which houses the protection projection 16 is provided only around the engaging hole 15 of the exterior member 8 on the ten o'clock side. As a result of this structure, even if the exterior member 8 is attempted to be attached to the outer peripheral portion of the case main body 7 with its twelve o'clock side and six o'clock side reversed, the exterior member 8 cannot be attached to the outer peripheral portion of the case main body 7.

That is, in the case of this wristwatch case 1, if the exterior member 8 is accidentally attempted to be attached to the outer peripheral portion of the case main body 7 with its twelve o'clock side and six o'clock side reversed, the engaging hole 15 on the four o'clock side corresponds to the operation head section 11*b* on the ten o'clock side and the engaging hole 15 on the ten o'clock side corresponds to the operation head section 11*b* on the four o'clock side. As a result, the exterior member 8 cannot be attached to the outer peripheral portion of the case main body 7.

More specifically, since no guide housing section 17 is formed around the engaging hole 15 on the four o'clock side, the protection projection 16 of the case main body 7 on the ten o'clock side comes in contact with the inner surface of the exterior member 8, whereby the operation head section 11*b* on the ten o'clock side cannot be inserted into the engaging hole 15 of the exterior member 8 on the four o'clock side. As a result of this structure, the exterior member 8 is prevented from being attached to the case main body 7 upside down.

The above-described wristwatch case 1 has the structure in which, among the plurality of operation members 11, only one operation member 11 on the ten o'clock side is used to perform time correction by switch operations. However, when the exterior member 8 is being switched to another exterior member, this operation member 11 does not enter the ON state even though it is pressed. As a result of this structure, unintentional time correction can be prevented.

In the above-described embodiment, the protection projection 16 is provided on the portion corresponding to the penetration hole 10 of the case main body 7 on the ten o'clock side. However, the present invention is not limited thereto, and a structure may be adopted in which, among the two o'clock side, four o'clock side, eight o'clock side, and ten o'clock side of the case main body 7, the protection projection 16 is provided on one of the sides excluding the ten o'clock side.

In this structure, among the two o'clock side, four o'clock side, eight o'clock side, and ten o'clock side of the exterior member 8, the guide housing section 17 which houses the protection projection 16 is provided on one of the sides excluding the ten o'clock side. Also, in this structure, among the operation members 11 on the two o'clock side, the four o'clock side, the eight o'clock side, and the ten o'clock side, one operation member 11 corresponding to the protection projection 16 is formed having a movement stroke greater than the axial length of the corresponding engaging hole 15 of the exterior member 8.

Also, in the above-described embodiment, the protection projection 16 is formed in a substantially cylindrical shape such that its projection length is longest at its upper rim portion and gradually becomes shorter toward its lower side, and its lower rim portion is substantially flush with the outer peripheral surface of the case main body 7. However, the present invention is not limited thereto, and a structure may be adopted in which the protection projection 16 is formed such that its projection length is longest at its upper rim portion and becomes shorter stepwise (for example, a step shape) toward its lower side. Moreover, a structure may be adopted in which the lower rim portion of the protection projection 16 does not project and is flush with the outer peripheral surface of the case main body 7.

Furthermore, in the above-described embodiment, the detachment groove 21 is provided in the portion corresponding to the three o'clock side of the lower end surface of the exterior member 8. However, the present invention is not limited thereto, and a structure may be adopted in which a plurality of detachment grooves 21 is provided which includes an additional detachment groove 21 provided in a portion corresponding to the nine o'clock side of the lower end surface of the exterior member 8.

Still further, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a surface clock.

In addition, the present invention is not necessarily required to be applied in timepieces, and is applicable to electronic devices such as a portable telephone and a portable information terminal.

While the present invention has been described with reference to the preferred embodiments, it is intended that the invention be not limited by any of the details of the description therein but includes all the embodiments which fall within the scope of the appended claims.

What is claimed is:

1. A case comprising:

a case main body;

an operation member comprising an operation head portion, wherein at least a portion of the operation head portion protrudes outside of the case main body; and an exterior member configured to be detachably attached to the case main body, wherein the exterior member defines an engaging hole into which the operation head portion is inserted along a first axis of the engaging hole, wherein the case main body comprises a protection projection provided on an outer peripheral surface of the case main body such that a thickness of the protection projection along a second axis perpendicular to the first axis of the engaging hole decreases in a first direction from the case main body towards the engaging hole, and wherein the exterior member comprises a housing portion, in a cross-section of the housing portion including the first axis and a second direction perpendicular to the first axis and away from the operation head portion, a thickness of the housing portion along the first axis increases in the second direction to define a space in which the protection projection of the case main body is housed.

2. The case according to claim 1, wherein a lower end portion of the housing portion forms a surface that defines the engaging hole of the exterior member.

3. The case according to claim 2, wherein the operation member is formed such that a movement stroke of the operation member along the first axis of the engaging hole is greater than an axial length of the engaging hole of the exterior member along the first axis of the engaging hole.

4. The case according to claim 3, wherein the operation member is arranged in the engaging hole of the exterior member without the operation head portion protruding outside of the exterior member.

5. The case according to claim 3, wherein the case main body comprises a locking portion, and wherein the exterior member comprises an engaging portion configured to be disengageably engaged with the locking portion of the case main body.

6. The case according to claim 3, wherein the exterior member defines a detachment groove provided in a lower end surface of the exterior member so as to be used to detach the exterior member from the case main body.

7. The case according to claim 2, wherein the operation member is arranged in the engaging hole of the exterior member without the operation head portion protruding outside of the exterior member.

8. The case according to claim 7, wherein the case main body comprises a locking portion, and wherein the exterior member comprises an engaging portion configured to be disengageably engaged with the locking portion of the case main body.

9. The case according to claim 7, wherein the exterior member defines a detachment groove provided in a lower end surface of the exterior member so as to be used to detach the exterior member from the case main body.

10. The case according to claim 2, wherein the case main body comprises a locking portion, and wherein the exterior member comprises an engaging portion configured to be disengageably engaged with the locking portion of the case main body.

11. The case according to claim 2, wherein the exterior member defines a detachment groove provided in a lower end surface of the exterior member so as to be used to detach the exterior member from the case main body.

12. The case according to claim 2, wherein the operation member is a first operation member, wherein the case further comprises a second operation member, and wherein the protection projection of the case main body protects the operation head portion of the first operation member.

13. The case according to claim 1, wherein the case main body comprises a locking portion, and wherein the exterior member comprises an engaging portion configured to be disengageably engaged with the locking portion of the case main body.

14. The case according to claim 1, wherein the exterior member defines a detachment groove provided in a lower end surface of the exterior member so as to be used to detach the exterior member from the case main body.

15. The case according to claim 1, wherein the operation member is a first operation member, wherein the case further comprises a second operation member, and wherein the protection projection of the case main body protects the operation head portion of the first operation member.

16. The case according to claim 15, wherein the first operation member which is protected by the protection projection is used for time correction by a switch operation.

17. A timepiece comprising the case according to claim 1.

18. An exterior member for a case, wherein the case comprises:

a case main body; and an operation member comprising an operation head portion, wherein at least as portion of the operation head portion protrudes outside of the case main body, and wherein the exterior member comprises:

an exterior member body configured to be detachably attached to the case main body, wherein the exterior member body defines an engaging hole into which the operation head portion is inserted along a first axis of the engaging hole, wherein the case main body comprises a protection projection provided on an outer peripheral surface of the case main body such that a thickness of the protection projection along a second axis perpendicular to the first axis of the engaging hole decreases in a first direction from the case main body towards the engaging hole, and wherein the exterior member body comprises a housing portion, in a cross-section of the housing portion including the first axis and a second direction perpendicular to the first axis and away from the operation head portion, a thickness of the housing portion along the first axis increases in the second direction to define a space in which the protection projection of the case main body is housed.

19. The exterior member according to claim 18, wherein the case further comprises a glass and a back cover, wherein the case main body is arranged between the glass and the back cover, and wherein the thickness of the housing portion along the first axis increases in the second direction perpendicular to the first axis from the back cover towards the glass.

20. A timepiece comprising the exterior member according to claim 18.

* * * * *